United States Patent
Ma (10) Patent No.: US 10,097,776 B2
(45) Date of Patent: Oct. 9, 2018

(54) READING CIRCUIT AND DRIVING METHOD THEREOF, AND PHOTOELECTRIC DETECTOR

(71) Applicant: BOE TECHNOLOGY GROUP CO., LTD., Beijing (CN)

(72) Inventor: Zhanjie Ma, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 15/667,244

(22) Filed: Aug. 2, 2017

(65) Prior Publication Data

US 2018/0063451 A1 Mar. 1, 2018

(30) Foreign Application Priority Data

Aug. 24, 2016 (CN) .......................... 2016 1 0718413

(51) Int. Cl.
*H04N 5/359* (2011.01)
*H04N 5/355* (2011.01)
*H04N 5/3745* (2011.01)
*H04N 5/378* (2011.01)

(52) U.S. Cl.
CPC .......... *H04N 5/3559* (2013.01); *H04N 5/359* (2013.01); *H04N 5/378* (2013.01); *H04N 5/37452* (2013.01)

(58) Field of Classification Search
CPC ...... H04N 5/359; H04N 5/378; H04N 5/3559; H04N 5/903; H04N 5/3594; H04N 5/37452
See application file for complete search history.

(56) References Cited

U.S. PATENT DOCUMENTS

| | | | |
|---|---|---|---|
| 6,667,768 B1* | 12/2003 | Fossum | H01L 27/14609 257/E27.132 |
| 2004/0251394 A1* | 12/2004 | Rhodes | H01L 27/14603 250/208.1 |

OTHER PUBLICATIONS

A research on InGaAs-MSM semiconductor infrared detector array dated May 2011, along with the English Abstract.

* cited by examiner

*Primary Examiner* — Nelson D. Hernández Hernández
(74) *Attorney, Agent, or Firm* — Nath, Goldberg & Meyer; Joshua B. Goldberg (57) ABSTRACT

The present disclosure provides a reading circuit, a driving method of the reading circuit and a photoelectric detector including the reading circuit. The reading circuit includes a reset sub-circuit, a readout sub-circuit, a driving sub-circuit and an integration sub-circuit. The reset sub-circuit is configured to reset voltages at the first node and the second node under the control of a reset signal inputted from the first signal terminal. The integration sub-circuit is configured to cause the first node and the second node to communicate with each other so as to change the voltages at the first node and the second node. The readout sub-circuit is configured to read out a current value in a case where the voltage at the first node controls the driving sub-circuit to be turned on, and output the current value through the fifth signal terminal.

20 Claims, 3 Drawing Sheets

READING CIRCUIT AND DRIVING METHOD THEREOF, AND PHOTOELECTRIC DETECTOR

CROSS-REFERENCE TO RELATED APPLICATION

This application claims priority to Chinese Patent Application No. 201610718413.2, filed on Aug. 24, 2016 in the Chinese Intellectual Property Office, the disclosure of which is incorporated by reference herein.

FIELD OF THE INVENTION

The present disclosure relates to the field of photoelectric detection technology, and specifically relates to a reading circuit and a driving method thereof, and a photoelectric detector including the reading circuit.

BACKGROUND OF THE INVENTION

In general, a photoelectric detector includes a photodiode array and a reading circuit. The differences in the performance and parameters of the reading circuit have a lot to do with the performance of the whole photoelectric detector. Therefore, selecting an appropriate structure of a reading circuit will help to improve the Signal Noise Ratio (SNR) of a photoelectric detector.

SUMMARY OF THE INVENTION

The present disclosure is directed to providing a reading circuit capable of controlling the magnitude of a current flowing to an external signal terminal to improve the SNR of the reading circuit, and a photoelectric detector including the reading circuit.

The technical solutions for solving the technical problem of the present disclosure include a reading circuit including a reset sub-circuit, a readout sub-circuit, a driving sub-circuit and an integration sub-circuit;

the reset sub-circuit is connected with a first node, a first signal terminal, a second node and the driving sub-circuit;

the driving sub-circuit is connected with the reset sub-circuit and a second signal terminal;

the integration sub-circuit is connected with a third signal terminal, the first node and the second node;

the readout sub-circuit is connected with a fourth signal terminal, the reset sub-circuit and a fifth signal terminal;

the reset sub-circuit is configured to reset voltages at the first node and the second node under the control of a reset signal inputted from the first signal terminal;

the integration sub-circuit is configured to cause the first node and the second node to communicate with each other so as to change the voltages at the first node and the second node; and the readout sub-circuit is configured to read out a current value in a case where the voltage at the first node controls the driving sub-circuit to be turned on, and output the current value through the fifth signal terminal.

Optionally, the reading circuit further includes a detection device, a first storage sub-circuit and a second storage sub-circuit;

the detection device is connected with the reset sub-circuit and a sixth signal terminal;

the first storage sub-circuit is connected with the second signal terminal and the first node; and the second storage sub-circuit is connected with the second node and the sixth signal terminal.

Optionally, the second storage sub-circuit includes a second capacitor, a first electrode of the second capacitor is connected to the second node, and a second electrode of the second capacitor is connected to the sixth signal terminal; and the second storage sub-circuit is configured to control the voltage at the first node under the control of a sixth signal inputted from the sixth signal terminal.

Optionally, the reading circuit further includes: a detection device, a first storage sub-circuit and a second storage sub-circuit;

the detection device is connected with the reset sub-circuit and a seventh signal terminal;

the first storage sub-circuit is connected with the second signal terminal and the first node; and the second storage sub-circuit is connected with the second node and a eighth signal terminal.

Optionally, the second storage sub-circuit includes a second capacitor, a first electrode of the second capacitor is connected to the second node, and a second electrode of the second capacitor is connected to the eighth signal terminal.

Optionally, the second storage sub-circuit is configured to control the voltage at the first node by a signal inputted from the eighth signal terminal.

Optionally, the reset sub-circuit includes a first switching transistor and a second switching transistor, a control electrode of the first switching transistor is connected to the first signal terminal, a first electrode of the first switching transistor is connected to the second node, and a second electrode of the first switching transistor is connected to the second switching transistor; and a control electrode of the second switching transistor is connected to the first signal terminal, a first electrode of the second switching transistor is connected to the first node, and a second electrode of the second switching transistor is connected to the first switching transistor.

Optionally, the first storage sub-circuit includes a first capacitor, a first electrode of the first capacitor is connected to the second signal terminal, and a second electrode of the first capacitor is connected to the first node.

Optionally, the driving sub-circuit includes a driving transistor, a control electrode and a second electrode of the driving transistor are connected to the reset sub-circuit, and a first electrode of the driving transistor is connected to the second signal terminal.

Optionally, the integration sub-circuit includes a third switching transistor, a control electrode of the third switching transistor is connected to the third signal terminal, a first electrode of the third switching transistor is connected to the first node, and a second electrode of the third switching transistor is connected to the second node.

Optionally, the readout sub-circuit includes a fourth switching transistor, a control electrode of the fourth switching transistor is connected to the fourth signal terminal, a first electrode of the fourth switching transistor is connected to the fifth signal terminal, and a second electrode of the fourth switching transistor is connected to the reset sub-circuit.

Optionally, the detection device is a photoelectric detection device.

As another technical solution, the present disclosure also provides a photoelectric detector including at least one reading circuit as described above.

Optionally, the photoelectric detector includes a plurality of reading circuits disposed on a substrate in an array.

In the reading circuit and the photoelectric detector of the present disclosure, the reading circuit includes a reset sub-circuit, a readout sub-circuit, a driving sub-circuit and an integration sub-circuit. The reset sub-circuit is configured to reset the voltages at the first node and the second node under the control of a reset signal inputted from the first signal terminal. The integration sub-circuit is configured to cause the first node and the second node to communicate with each other so as to change the voltages at the first node and the second node. The readout sub-circuit is configured to read out a current value in a case where the voltage at the first node controls the driving sub-circuit to be turned on, and output the current value through the fifth signal terminal.

In addition, the present disclosure provides a driving method of a reading circuit including a reset stage, an integration stage and a readout stage, and the reading circuit is the reading circuit described above.

In the reset stage, the voltages at the first node and the second node are reset under the control of the reset signal inputted from the first signal terminal;

in the integration stage, the first node and the second node are caused to communicate with each other so as to change the voltages at the first node and the second node; and in the readout stage, in a case where the voltage at the first node controls the driving sub-circuit to be turned on, a current value is read out and the current value is outputted through the fifth signal terminal.

Optionally, the voltage at the first node is controlled under the control of a sixth signal inputted from a sixth signal terminal.

The driving method of the reading circuit further includes a jump stage in which the voltage at the first node jumps under the control of a signal inputted from an eighth signal terminal.

Optionally, the eighth signal terminal is restored from a high potential to a low potential after there is no signal outputted from the third signal terminal.

Optionally, the jump stage is in the integration stage and in an end period of the integration stage.

Optionally, a sum of the time required for the reset stage, the time required for the integration stage, and the time required for the readout phase is one frame.

DESCRIPTION OF THE PREFERRED EMBODIMENT

Figure 1:
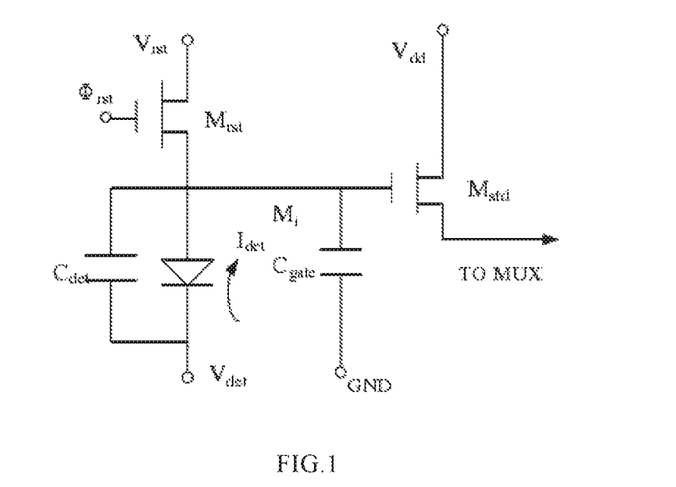
FIG. 1 is a schematic diagram of a structure of a reading circuit having a source following structure in the related art.

FIG. 1 is a schematic diagram of a structure of a reading circuit with a source following structure in the related art, in which a first electrode of a first capacitor $C_{det}$ is connected to a first electrode of a first transistor Mrst, and a second electrode of the first capacitor $C_{det}$ is connected to a signal terminal Vdet; a control electrode of the first transistor Mrst is connected to a signal terminal $\phi_{rst}$, and a second electrode of the first transistor Mrst is connected to a signal terminal Vrst; a first electrode of a detection device is connected to the first electrode of the first transistor Mrst, and a second electrode of the detection device is connected to the signal terminal Vdet; a first electrode of a second capacitor $C_{gate}$ is connected to the first electrode of the first transistor Mrst, and a second electrode of the second capacitor $C_{gate}$ is connected to the ground; a control electrode of the second transistor Msfd is connected to the first electrode of the second capacitor $C_{gate}$, and a first electrode of the second transistor Msfd is connected to a signal terminal Vdd, and a second electrode of the second transistor Msfd is connected to an output terminal.

The reading circuit shown as FIG. 1 has the source following structure, and may improve the SNR of the reading circuit to a certain extent. However, when the first transistor Mrst is turned on, the current Ids flowing through the second transistor Msfd is:

$$Ids = \frac{1}{2}K(Vg - Vdd - Vth)^2, K = \frac{W}{L}Cu$$

where, Vg is the voltage at the control electrode of the second transistor Msfd; Vdd is the voltage at the first electrode of the second transistor Msfd; Vth is the threshold voltage of the second transistor Msfd;

$$\frac{W}{L}$$

is the width to length ratio of the channel of the second transistor Msfd; C is the dielectric constant of the channel insulating layer, and u is the mobility of carriers of the channel active layer.

As can be seen from the above equation, the magnitude of the current Ids flowing to the external signal terminal is related to the threshold voltage of the second transistor Msfd. However, because the backplane process causes differences in the characteristics of the fabricated thin film transistor, there is a difference in the detection current Ids flowing through the source follower, consequently affecting SNR of the reading circuit.

The present disclosure improves the SNR of the reading circuit by changing the structure of the reading circuit.

The present disclosure will be described in further detail below with reference to the accompanying drawings and specific embodiments in order to provide a better understanding of the technical solutions of the present disclosure to those skilled in the art.

Embodiment 1

Figure 2:
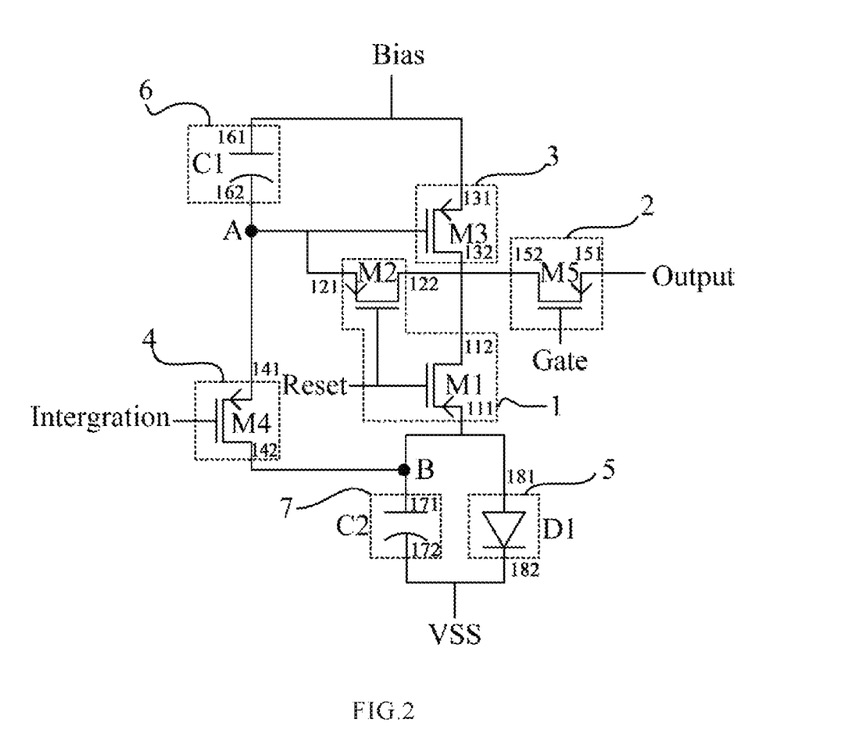
FIG. 2 is a schematic diagram of a structure of a reading circuit according to Embodiment 1 of the present disclosure.
Figure 3:
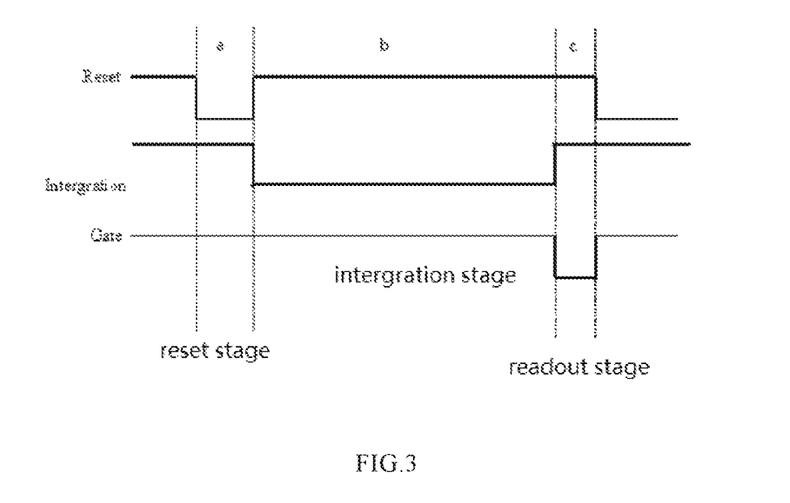
FIG. 3 is a timing diagram for driving the reading circuit of FIG. 2.

Referring to FIG. 2 and FIG. 3, the present embodiment provides a reading circuit including a reset sub-circuit 1, a readout sub-circuit 2, a driving sub-circuit 3 and an integration sub-circuit 4. The reset sub-circuit 1 is connected with a first node A, a first signal terminal Reset, a second node B and the driving sub-circuit 3. The driving sub-circuit 3 is connected with the reset sub-circuit 1 and a second signal terminal Bias. The integration sub-circuit 4 is connected with a third signal terminal Integration, the first node A and the second node B. The readout sub-circuit 2 is connected with a fourth signal terminal Gate, the reset sub-circuit 1 and a fifth signal terminal Output.

The reset sub-circuit 1 is configured to reset the voltages at the first node A and the second node B under the control of a reset signal inputted from the first signal terminal Reset.

The integration sub-circuit 4 is configured to cause the first node A and the second node B to communicate with each other so as to change the voltages at the first node A and the second node B.

The readout sub-circuit 2 is configured to read out a current value in a case where the voltage at the first node A controls the driving sub-circuit 3 to be turned on, and output the current value through the fifth signal terminal Output.

The reading circuit further includes: a detection device 5, a first storage sub-circuit 6 and a second storage sub-circuit 7. The detection device 5 is connected with the reset sub-circuit 1 and a sixth signal terminal VSS. The first storage sub-circuit 6 is connected with the second signal terminal Bias and the first node A. The second storage sub-circuit 7 is connected with the second node B and the sixth signal terminal VSS.

The second storage sub-circuit 7 includes a second capacitor C2. A first electrode 171 of the second capacitor C2 is connected to the second node B, and a second electrode 172 of the second capacitor C2 is connected to the sixth signal terminal VSS. The second storage sub-circuit 7 is configured to control the voltage at the first node A by a sixth signal inputted from the sixth signal terminal VSS.

The reset sub-circuit 1 includes a first switching transistor M1 and a second switching transistor M2. A control electrode of the first switching transistor M1 is connected to the first signal terminal Reset, a first electrode 111 of the first switching transistor M1 is connected to the second node B, and a second electrode 112 of the first switching transistor M1 is connected to the second switching transistor M2. A control electrode of the second switching transistor M2 is connected to the first signal terminal Reset, a first electrode 121 of the second switching transistor M2 is connected to the first node A, and a second electrode 122 of the second switching transistor M2 is connected to the first switching transistor M1.

The first storage sub-circuit 6 includes a first capacitor C1. A first electrode 161 of the first capacitor C1 is connected to the second signal terminal Bias, and a second electrode 162 of the first capacitor C1 is connected to the first node A.

The driving sub-circuit 3 includes a driving transistor M3. A control electrode and a second electrode 132 of the driving transistor M3 are connected to the reset sub-circuit 1, and a first electrode 131 of the driving transistor M3 is connected to the second signal terminal Bias.

The integration sub-circuit 4 includes a third switching transistor M4. A control electrode of the third switching transistor M4 is connected to the third signal terminal Integration, a first electrode 141 of the third switching transistor M4 is connected to the first node A, and a second electrode 142 of the third switching transistor M4 is connected to the second node B.

The readout sub-circuit 2 includes a fourth switching transistor M5. A control electrode of the fourth switching transistor M5 is connected to the fourth signal terminal Gate, a first electrode 151 of the fourth switching transistor M5 is connected to the fifth signal terminal Output, and a second electrode 152 of the fourth switching transistor M5 is connected to the reset sub-circuit 1.

The detection device 5 is a photoelectric detection device D1.

All of the transistors used in the reading circuit of the embodiment are P-type transistors, and the sixth signal terminal VSS is supplied with a low-level voltage. The operation of the reading circuit will be described below with reference to FIG. 3. In FIG. 3, the horizontal axis represents time, where signs "a", "b" and "c" represent a reset stage, an integration stage, and a readout stage, respectively, and the vertical axis represents the signal levels of the first signal terminal Reset, the third signal terminal Integration, and the fourth signal terminal Gate in each stage.

The reset stage (as shown in stage "a"):

A low voltage signal is inputted from the first signal terminal Reset to the control electrode (gate electrode) of the first switching transistor M1 to turn on the first switching transistor M1. A low voltage signal is inputted from the first signal terminal Reset to the control electrode (gate electrode) of the second switching transistor M2 to turn on the second switching transistor M2. Meanwhile, a high voltage signal is inputted from the third signal terminal Integration to the control electrode (gate electrode) of the third switching transistor M4 to turn off the third switching transistor M4, and a high voltage signal is inputted from the fourth signal terminal Gate to the control electrode (gate electrode) of the fourth switching transistor M5 to turn off the fourth switching transistor M5. At this time, the first switching transistor M1 and the second switching transistor M2 controlled by the first signal terminal Reset are turned on. The control electrode (gate electrode) and the second electrode (drain electrode) 132 of the driving transistor M3 are connected since the second switching transistor M2 is turned on, so that the driving transistor M3 becomes a source following structure of a diode connection. Since the first switching transistor M1 and the second switching transistor M2 are turned on, the first electrode 181 of the photoelectric detection device D1 is connected to the control electrode (gate electrode) and the second electrode (drain electrode) 132 of the driving transistor M3, and the signals on the capacitors C1 and C2 are reset. Therefore, the voltage at the first node A is changed from Vbias to Vbias+Vth, and the voltage at the second node B is changed from VSS to Vbias+Vth, wherein Vbias is the voltage signal on the second signal terminal Bias, and Vth is the threshold voltage of the driving transistor M3. The reason for such arrangement is to ensure that the first electrode 181 of the photoelectric detection device D1 has a same potential before each light sensing.

The integration stage (as shown in stage "b"):

A low voltage signal is inputted from the third signal terminal Integration to the control electrode (gate electrode) of the third switching transistor M4 to turn on the third switching transistor M4. Meanwhile, a high voltage signal is inputted from the first signal terminal Reset to the control electrode (gate electrode) of the first switching transistor M1 and the control electrode (gate electrode) of the second switching transistor M2 to turn off the first switching transistor M1 and the second switching transistor M2. A high voltage signal is inputted from the fourth signal terminal Gate to the control electrode (gate electrode) of the fourth switching transistor M5 to turn off the fourth switching transistor M5. At this time, only the third switching transistor M4 controlled by the third signal terminal Integration is turned on, and accordingly the capacitors C1 and C2 are connected in series. At the same time, the photoelectric detection device D1 senses the optical power, and different optical powers cause photoelectric detection device D1 to generate different photocurrent so that the charge potentials at the first node A and the second node B are changed, and at this time, the potentials at the first node A and the second node B become Vbias+Vth+Vsignal, where Vsignal is the potential associated with a different optical power.

The readout stage (as shown in stage "c"):

A low voltage signal is inputted from the fourth signal terminal Gate to the control electrode (gate electrode) of the fourth switching transistor M5 to turn on the fourth switching transistor M5. A high voltage signal is inputted from the first signal terminal Reset to the control electrodes (gate electrodes) of the first switching transistor M1 and the second switching transistor M2 to turn off the first switching transistor M1 and the second switching transistor M2. A high voltage signal is inputted from the third signal terminal Integration to the control electrode (gate electrode) of the third switching transistor M4 to turn off the third switching transistor M4. At this time, the fourth switching transistor M5 controlled by the fourth signal terminal Gate is turned on. At the same time, the driving transistor M3 controlled by the voltage at the first node A is also turned on, and the potential at the first node A is the potential in the integration stage, that is, Vbias+Vth+Vsignal, and is maintained by the first capacitor C1. The driving transistor M3 is in the saturation status at this time. Accordingly the current flowing through the driving transistor M3 may be expressed as:

$$Ids = \frac{1}{2}K(Vbias + Vth + Vsignal - Vbias - Vth)^2.$$

That is, $Ids = \frac{1}{2}KVsignal^2$, where, $K = \frac{W}{L}Cu$, $$\frac{W}{L}$$

is the width to length ratio of the channel of the driving transistor M3, C is the dielectric constant of the channel insulating layer, and u is the mobility of carriers of the channel active layer. Vsignal is the potential associated with the optical power.

The current Ids flows to the external sensing and amplifying device through the fourth switching transistor M5, that is, the current Ids is outputted through the fifth signal terminal Output.

As can be seen from the above calculation, the current value is related to the optical power, but independent of the threshold voltage of the driving transistor M3. That is, the current value is not affected by the backplane process, so the SNR of the reading circuit is improved.

Certainly, the transistors of the present embodiment are not limited to P-type transistors, but may be N-type transistors, as long as they can adjust the level magnitude inputted in each stage, which will not be repeated here.

The reading circuit of the present embodiment includes a reset sub-circuit 1, a readout sub-circuit 2, a driving sub-circuit 3, and an integration sub-circuit 4. The reset sub-circuit 1 is configured to reset the voltages at the first node A and the second node B under the control of a reset signal inputted from the first signal terminal Reset. The integration sub-circuit 4 is configured to cause the first node A and the second node B to communicate with each other so as to change the voltages at the first node A and the second node B. The readout sub-circuit 2 is configured to read out a current value in a case where the voltage at the first node A controls the driving sub-circuit 3 to be turned on. The reading circuit of the present embodiment is capable of controlling the magnitude of the current flowing to the external signal terminal by reducing voltage generated on the storage capacitor by the non-photogenic current, and thereby the SNR of the reading circuit is improved.

Embodiment 2

Figure 4:
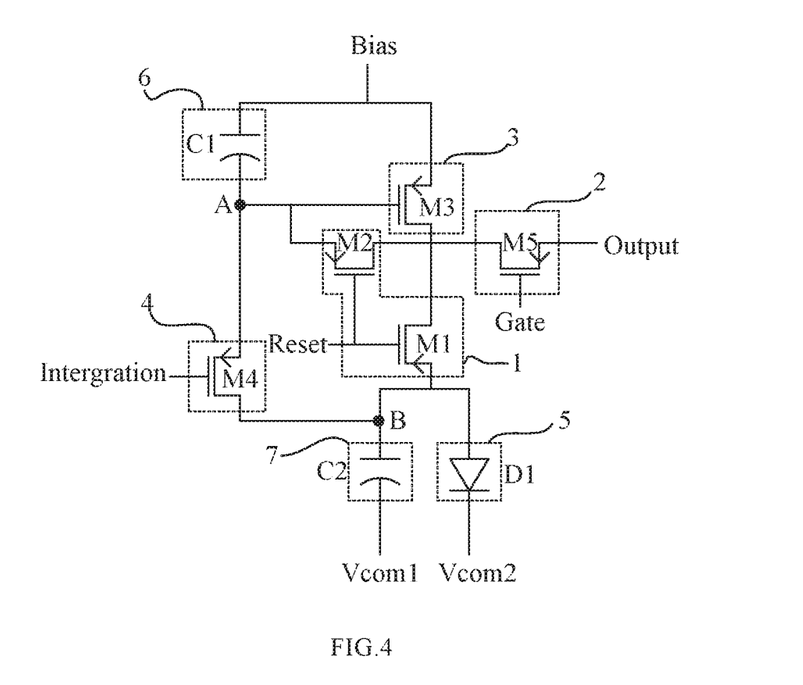
FIG. 4 is a schematic diagram of a structure of a reading circuit according to Embodiment 2 of the present disclosure.
Figure 5:
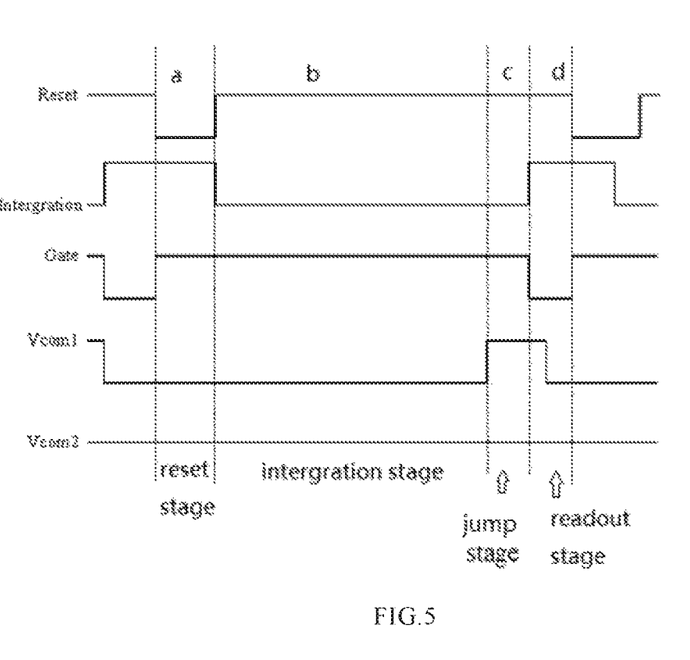
FIG. 5 is a timing diagram for driving the reading circuit of FIG. 4.

Referring FIG. 4 and FIG. 5, the present embodiment provides a reading circuit having a structure similar to that of the reading circuit of Embodiment 1, which differs from the reading circuit of Embodiment 1 in that the detection device 5 is connected with the reset sub-circuit 1 and the seventh signal terminal Vcom2, and the second storage sub-circuit 7 is connected with the second node B and the eighth signal terminal Vcom1.

The second storage sub-circuit 7 includes a second capacitor C2. The first electrode 171 of the second capacitor C2 is connected to the second node B, and the second electrode 172 of the second capacitor C2 is connected to the eighth signal terminal Vcom1.

All of the transistors used in the reading circuit of the embodiment are P-type transistors. The seventh signal terminal Vcom2 is supplied with a low-level voltage. The operation of the reading circuit will be described below with reference to FIG. 5. In FIG. 5, the horizontal axis represents time, where signs "a", "b", "c" and "d" represent a reset stage, an integration stage, a jump stage, and a readout stage, respectively, and the vertical axis represents the signal levels of the first signal terminal Reset, the third signal terminal Integration, the fourth signal terminal Gate, the seventh signal terminal Vcom2 and the eighth signal terminal Vcom1 in each stage.

The reset stage (as shown in stage "a"):

A low voltage signal is inputted from the first signal terminal Reset to the control electrode (gate electrode) of the first switching transistor M1 to turn on the first switching transistors M1. A low voltage signal is inputted from the first signal terminal Reset to the control electrode (gate electrode) of the second switching transistor M2 to turn on the second switching transistor M2. Meanwhile, a high voltage signal is inputted from the third signal terminal Integration to the control electrode (gate electrode) of the third switching transistors M4 to turn off the third switching transistor M4, and a high voltage signal is inputted from the fourth signal terminal Gate to the control electrode (gate electrode) of the fourth switching transistor M5 to turn off the fourth switching transistor M5. At this time, the first switching transistor M1 and the second switching transistor M2 controlled by the first signal terminal Reset are turned on. The control electrode (gate electrode) and the second electrode (drain electrode) 132 of the driving transistor M3 are connected since the second switching transistor M2 is turned on, so that the driving transistor M3 becomes a source following structure of a diode connection. Since the first switching transistor M1 and the second switching transistor M2 are turned on, the first electrode 181 of the photoelectric detection device D1 is connected to the control electrode (gate electrode) and the second electrode (drain electrode) 132 of the driving transistor M3, and the signals on the capacitors C1 and C2 are reset. Therefore, the voltage at the first node A is changed from Vbias to Vbias+Vth, and the voltage at the second node B is changed from Vcom1 to Vbias+Vth, wherein Vbias is the voltage signal on the second signal terminal Bias, and Vth is the threshold voltage of the driving transistor M3. The reason for such arrangement is to ensure that the first electrode 181 of the photoelectric detection device D1 has a same potential before each light sensing.

The integration stage (as shown in stage "b"):

A low voltage signal is inputted from the third signal terminal Integration to the control electrode (gate electrode) of the third switching transistor M4 to turn on the third switching transistor M4. Meanwhile, a high voltage signal is inputted from the first signal terminal Reset to the control electrode (gate electrode) of the first switching transistor M1 and the control electrode (gate electrode) of the second switching transistor M2 to turn off the first switching transistor M1 and the second switching transistor M2. A high voltage signal is inputted from the fourth signal terminal Gate to the control electrode (gate electrode) of the fourth switching transistor M5 to turn off the fourth switching transistor M5. At this time, only the third switching transistor M4 controlled by the third signal terminal Integration is turned on, and accordingly, the capacitors C1 and C2 are connected in series. At the same time, the photoelectric detection device D1 senses the optical power, and different optical powers cause photoelectric detection device D1 to generate different photocurrent so that the charge potentials at the first node A and the second node B are changed, and at this time, the potentials at the first node A and the second node B become Vbias+Vth+Vsignal, where Vsignal is the potential associated with a different optical power.

The jump stage (as shown in stage "c"):

A low voltage signal is inputted from the third signal terminal Integration to the control electrode (gate electrode) of the third switching transistor M4 to turn on the third switching transistor M4. Meanwhile a high voltage signal is inputted from the first signal terminal Reset to the control electrode (gate electrode) of the first switching transistor M1 and the control electrode (gate electrode) of the second switching transistor M2 to turn off the first switching transistor M1 and the second switching transistor M2. A high voltage signal is inputted from the fourth signal terminal Gate to the control electrode (gate electrode) of the fourth switching transistor M5 to turn off the fourth switching transistor M5. At this time, only the third switching transistor M4 controlled by the third signal terminal Integration is turned on, and accordingly, the capacitors C1 and C2 are connected in series. In this case, since potential on the eighth signal terminal Vcom1 is raised from the low potential to the high potential to generate the potential difference $\Delta V$, the voltage on the second electrode of the second capacitor C2 (i.e. the voltage at the second node B) jumps from Vbias+Vth+Vsignal to Vbias+Vth+Vsignal+$\Delta V$, according to the law of charge conservation. Certainly, the voltage at the first node A is equal to the voltage at the second node B.

It should be noted that the jump stage is in the integration stage but in the end period of the integration stage. The eighth signal terminal Vcom1 is restored from the high potential to the low potential after there is no signal outputted from the third signal terminal Integration.

The readout stage (as shown in stage "d"):

A low voltage signal is inputted from the fourth signal terminal Gate to the control electrode (gate electrode) of the fourth switching transistor M5 to turn on the fourth switching transistor M5. A high voltage signal is inputted from the first signal terminal Reset to the control electrodes (gate electrodes) of the first switching transistor M1 and the second switching transistor M2 to turn off the first switching transistor M1 and the second switching transistor M2. A high voltage signal is inputted from the third signal terminal Integration to the control electrode (gate electrode) of the third switching transistor M4 to turn off the third switching transistor M4. At this time, the fourth switching transistor M5 controlled by the fourth signal terminal Gate is turned on. At the same time, since the driving transistor M3 is controlled by the voltage at the first node A to be either turned on or turned off, the potential at the first node A is Vbias+Vth+Vsignal $\Delta V$, which is the potential in the jump stage, and is maintained by the first capacitor C1.

The condition for controlling the driving transistor M3 to be turned on is: Vg−Vs−Vth<0, where Vg is the voltage on control electrode (gate electrode) of the driving transistor M3, Vs is the voltage on the first electrode (source electrode) 131 of the driving transistor M3, and Vth is the threshold voltage of the driving transistor M3. That is, Vg−Vs−Vth= (Vbias+Vth+Vsignal+$\Delta V$)−Vbias−Vth=Vsignal+$\Delta V$, where Vsignal is a negative signal with respect to Vbias, and the Vbias voltage on the optoelectronic detection device D1 is continuously discharged by the optoelectronic detection device D1 in the integration stage. Thereby the voltage difference before and after the discharge is Vsignal, that is, Vsignal is a negative bias voltage. The magnitude of Vsignal is associated with the photoelectric conversion current of the optoelectronic detection device D1. When the photoelectric conversion current is very large, Vsignal will be more negative (i.e., the absolute value is larger), and when the photoelectric conversion current is very small, Vsignal will be closer to positive (i.e., the absolute value is smaller). That is, when there is light irradiation, there is a photo-generated current in the reading circuit, and thereby Vsignal of the optoelectronic detection device D1 is more negative. When there is no light irradiation, there is no photo-generated current in the reading circuit, there is only a dark current, and thereby Vsignal of the optoelectronic detection device D1 is more positive.

It can be known from the above that, in the reading circuit where only the dark current is generated, the driving transistor M3 satisfies Vgs−Vth=Vsignal+$\Delta V$ (Vgs=Vg−Vs). When Vsignal is more positive, since $\Delta V$ is positive, Vgs>Vth, at this time, the reading circuit is in the turned-off state, and no current is outputted from the fifth signal terminal Output. When there is light irradiation, there is a photo-generated current in the reading circuit. The driving transistor M3 satisfies: Vgs−Vth=Vsignal+$\Delta V$. Since Vsignal is quite negative, Vsignal+$\Delta V$<0, that is Vgs<Vth, even though $\Delta V$ is positive. At this time, the driving transistor M3 is turned on and in the saturation state, and the current in the reading circuit can be outputted through the fifth signal terminal Output. Accordingly the current flowing through the driving transistor M3 may be expressed as:

$$Ids = \frac{1}{2}K(Vbias + Vth + Vsignal + \Delta V - Vbias - Vth)^2,$$

$$\text{that is, } Ids = \frac{1}{2}K(Vsignal + \Delta V)^2, \text{ where, } K = \frac{W}{L}Cu,$$

$$\frac{W}{L}$$

is the width to length ratio of the channel of the driving transistor M3, C is the dielectric constant of the channel insulating layer, and u is the mobility of carriers of the channel active layer. Vsignal is the potential associated with the optical power.

The current Ids flows to the external sensing and amplifying device through the fourth switching transistor M5, that is, the current Ids is outputted through the fifth signal terminal Output.

As can be seen from the above calculation, the current value is related to the optical power, but independent of the threshold voltage of the driving transistor M3. That is, the current value is not affected by the backplane process. Moreover, the non-photo-generated current that is turned off can be determined by selecting an appropriate jump voltage amplitude ΔV on the eighth signal terminal Vcom1, so that the SNR of the reading circuit is improved.

Certainly, the transistors of the present embodiment are not limited to P-type transistors, but may be N-type transistors, as long as they can adjust the level magnitude inputted in each stage, which will not be repeated here.

The reading circuit of the present embodiment includes a reset sub-circuit 1, a readout sub-circuit 2, a driving sub-circuit 3, and an integration sub-circuit 4. The reset sub-circuit 1 is configured to reset the voltages at the first node A and the second node B under the control of a reset signal inputted from the first signal terminal Rest. The integration sub-circuit 4 is configured to cause the first node A and the second node B to communicate with each other so as to change the voltages at the first node A and the second node B. The readout sub-circuit 2 is configured to read out the current value in a case where the voltage at the first node A controls the driving sub-circuit 3 to be turned on. The reading circuit of the present embodiment is capable of adjusting the magnitude of the voltage stored on the storage capacitor by the pulse voltage supplied from the eighth signal terminal Vcom1 and determining the magnitude of the current flowing to the external signal terminal based on the voltage. Further, the reading circuit of the present embodiment is capable of controlling the magnitude of the current flowing to the external signal terminal by reducing voltage generated on the storage capacitor by the non-photo-generated current, and thereby the SNR of the reading circuit is improved.

Embodiment 3

The present embodiment provides an optoelectronic detector including at least one reading circuit of Embodiment 1 or Embodiment 2.

It should be noted that the optoelectronic detector includes a plurality of reading circuits of Embodiment 1 or Embodiment 2 disposed on a substrate in the form of an array.

Optionally, as shown in FIG. 5, the sum of the time required for the reset stage, the time required for the integration stage, and the time required for the readout phase is one frame.

The optoelectronic detector of the present embodiment includes the reading circuit of Embodiment 1 or Embodiment 2, is capable of controlling the magnitude of the current flowing to the external signal terminal by reducing voltage generated on the storage capacitor by the non-photo-generated current, and thereby improves the SNR of the reading circuit.

Embodiment 4

The present embodiment provides a driving method of a reading circuit. The reading circuit includes a reset sub-circuit, a readout sub-circuit, a driving sub-circuit, an integration sub-circuit, a detection device, a first storage sub-circuit and a second storage sub-circuit. The detection device is connected with the reset sub-circuit and sixth signal terminal. The first storage sub-circuit is connected with the second signal terminal and the first node, and the second storage sub-circuit is connected with the second node and the sixth signal terminal.

The driving method includes:
in the reset stage, resetting voltages at the first node and the second node under the control of a reset signal inputted from the first signal terminal;
in the integration stage, the first node and the second node are caused to communicate with each other so as to change the voltages at the first node and the second node; and
in the readout stage, in a case where the voltage at the first node controls the driving sub-circuit to be turned on, reading out the current value and outputting the current value through the fifth signal terminal.

The driving method of the reading circuit provided in the present embodiment is used to drive the reading circuit of Embodiment 1, the detailed description of which may refer to the reading circuit of Embodiment 1 and will not be repeated here.

The driving method of the reading circuit provided in the present embodiment is used to drive the reading circuit of Embodiment 1, and is capable of controlling the magnitude of the current flowing to the external signal terminal by reducing voltage generated on the storage capacitor by the non-photo-generated current, thereby improving the SNR of the reading circuit.

Embodiment 5

The present embodiment provides a driving method of a reading circuit. The reading circuit includes a reset sub-circuit, a readout sub-circuit, a driving sub-circuit, an integration sub-circuit, a detection device, a first storage sub-circuit and a second storage sub-circuit. The detection device is connected with the reset sub-circuit and a seventh signal terminal. The first storage sub-circuit is connected with the second signal terminal and the first node, and the second storage sub-circuit is connected with the second node and the eighth signal terminal.

The driving method includes:
in the reset stage, resetting voltages at the first node and the second node under the control of the reset signal inputted from the first signal terminal;
in the integration stage, the first node and the second node are caused to communicate with each other so as to change the voltages at the first node and the second node;
in the jump stage, making the voltage at the first node jump under the control of the signal inputted from the eighth signal terminal; and
in the readout stage, in a case where the voltage of the first node controls the driving sub-circuit to be turned on, reading out the current value and outputting the current value through the fifth signal terminal.

The driving method of the reading circuit provided in the present embodiment is used to drive the reading circuit of Embodiment 2, the detailed description of which may refer to the reading circuit of Embodiment 2 and will not be repeated here.

The driving method of the reading circuit provided in the present embodiment is used to drive the reading circuit of Embodiment 2, and is capable of adjusting the magnitude of the voltage stored on the storage capacitor by the pulse voltage supplied from the eighth signal terminal Vcom1 and determining the magnitude of the current flowing to the external signal terminal based on the voltage. Further the driving method of the present embodiment is capable of controlling the magnitude of the current flowing to the external signal terminal by reducing voltage generated on the storage capacitor by the non-photo-generated current, thereby improving the SNR of the reading circuit.

It is to be understood that the above embodiments are merely illustrative embodiments adopted for the purpose of explaining the principle of the present disclosure, but the present disclosure is not limited thereto. It will be apparent to those skilled in the art that various changes and modifications can be made without departing from the spirit and substance of the present disclosure, and these changes and modifications are also to be regarded as falling into the scope of the present disclosure.

The invention claimed is:

1. A reading circuit comprising a reset sub-circuit, a readout sub-circuit, a driving sub-circuit and an integration sub-circuit, wherein
 the reset sub-circuit is connected with a first node, a first signal terminal, a second node and the driving sub-circuit;
 the driving sub-circuit is connected with the reset sub-circuit and a second signal terminal;
 the integration sub-circuit is connected with a third signal terminal, the first node and the second node;
 the readout sub-circuit is connected with a fourth signal terminal, the reset sub-circuit and a fifth signal terminal;
 the reset sub-circuit is configured to reset voltages at the first node and the second node under the control of a reset signal inputted from the first signal terminal;
 the integration sub-circuit is configured to cause the first node and the second node to communicate with each other so as to change the voltages at the first node and the second node; and
 the readout sub-circuit is configured to read out a current value in a case where the driving sub-circuit is controlled by the voltage at the first node to be turned on, and output the current value through the fifth signal terminal.

2. The reading circuit of claim 1, wherein the reading circuit further comprises a detection device, a first storage sub-circuit and a second storage sub-circuit;
 the detection device is connected with the reset sub-circuit and a sixth signal terminal;
 the first storage sub-circuit is connected with the second signal terminal and the first node; and
 the second storage sub-circuit is connected with the second node and the sixth signal terminal.

3. The reading circuit of claim 2, wherein the second storage sub-circuit comprises a second capacitor, a first electrode of the second capacitor is connected to the second node, and a second electrode of the second capacitor is connected to the sixth signal terminal; and
 the second storage sub-circuit is configured to control the voltage at the first node by a sixth signal inputted from the sixth signal terminal.

4. The reading circuit of claim 1, wherein the reading circuit further comprises: a detection device, a first storage sub-circuit and a second storage sub-circuit;
 the detection device is connected with the reset sub-circuit and a seventh signal terminal;
 the first storage sub-circuit is connected with the second signal terminal and the first node; and
 the second storage sub-circuit is connected with the second node and an eighth signal terminal.

5. The reading circuit of claim 4, wherein the second storage sub-circuit comprises a second capacitor, a first electrode of the second capacitor is connected to the second node, and a second electrode of the second capacitor is connected to the eighth signal terminal; and
 the second storage sub-circuit is configured to control the voltage at the first node by a signal inputted from the eighth signal terminal.

6. The reading circuit of claim 1, wherein, the reset sub-circuit comprises a first switching transistor and a second switching transistor;
 a control electrode of the first switching transistor is connected to the first signal terminal, a first electrode of the first switching transistor is connected to the second node, and a second electrode of the first switching transistor is connected to the second switching transistor; and
 a control electrode of the second switching transistor is connected to the first signal terminal, a first electrode of the second switching transistor is connected to the first node, and a second electrode of the second switching transistor is connected to the first switching transistor.

7. The reading circuit of claim 1, wherein the first storage sub-circuit comprises a first capacitor, a first electrode of the first capacitor is connected to the second signal terminal, and a second electrode of the first capacitor is connected to the first node.

8. The reading circuit of claim 1, wherein the driving sub-circuit comprises a driving transistor, a control electrode and a second electrode of the driving transistor are connected to the reset sub-circuit, and a first electrode of the driving transistor is connected to the second signal terminal.

9. The reading circuit of claim 1, wherein the integration sub-circuit comprises a third switching transistor, a control electrode of the third switching transistor is connected to the third signal terminal, a first electrode of the third switching transistor is connected to the first node, and a second electrode of the third switching transistor is connected to the second node.

10. The reading circuit of claim 1, wherein the readout sub-circuit comprises a fourth switching transistor, a control electrode of the fourth switching transistor is connected to the fourth signal terminal, a first electrode of the fourth switching transistor is connected to the fifth signal terminal, and a second electrode of the fourth switching transistor is connected to the reset sub-circuit.

11. The reading circuit of claim 1, wherein the detection device is a photoelectric detection device.

12. A photoelectric detector, comprising the reading circuit of claim 11.

13. The photoelectric detector of claim 12, comprising a plurality of reading circuits disposed on a substrate in an array.

14. A driving method of a reading circuit, comprising a reset stage, an integration stage and a readout stage, wherein the reading circuit is the reading circuit of claim 1.

15. The driving method of claim 14, wherein,
 in the reset stage, the voltages at the first node and the second node are reset under the control of the reset signal inputted from the first signal terminal;
 in the integration stage, the first node and the second node are caused to communicate with each other so as to change the voltages at the first node and the second node; and
 in the readout stage, in a case where the voltage at the first node controls the driving sub-circuit to be turned on, a current value is read out and outputted through the fifth signal terminal.

16. The driving method of claim 15, wherein the voltage at the first node is controlled by a sixth signal inputted from a sixth signal terminal.

17. The driving method of claim 14, further comprising a jump stage in which the voltage at the first node jumps under the control of a signal inputted from an eighth signal terminal.

18. The driving method of claim 17, wherein, the eighth signal terminal is restored from a high potential to a low potential when there is no signal outputted from the third signal terminal.

19. The driving method of claim 17, wherein, the jump stage is in the integration stage and at an end of the integration stage.

20. The driving method of claim 17, wherein, a sum of time required for the reset stage, time required for the integration stage, and time required for the readout phase is one frame.

* * * * *